(12) United States Patent
Harris

(10) Patent No.: US 6,260,138 B1
(45) Date of Patent: Jul. 10, 2001

(54) METHOD AND APPARATUS FOR BRANCH INSTRUCTION PROCESSING IN A PROCESSOR

(75) Inventor: Jeremy G Harris, Chalfont St Giles (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/118,642

(22) Filed: Jul. 17, 1998

(51) Int. Cl.[7] .............................. G06F 9/38; G06F 9/32; G06F 9/42
(52) U.S. Cl. ..................... 712/239; 712/237; 712/234; 711/210
(58) Field of Search ........................... 712/236.1, 239, 712/23, 219, 234, 217, 233, 237, 240, 236; 711/218, 200, 210

(56) References Cited

U.S. PATENT DOCUMENTS

| | | | |
|---|---|---|---|
| 5,206,940 | * 4/1993 | Murakami et al. | 711/218 |
| 5,461,722 | 10/1995 | Goto . | |
| 5,504,914 | * 4/1996 | Lai | 712/226 |
| 5,561,776 | * 10/1996 | Popescu et al. | 712/239 |
| 5,634,103 | 5/1997 | Dietz et al. . | |

FOREIGN PATENT DOCUMENTS

| | | |
|---|---|---|
| 0 474 297 | 11/1992 | (EP) . |
| 2 291 513 | 1/1996 | (GB) . |
| WO 98/00778 | 1/1998 | (WO) . |

OTHER PUBLICATIONS

J.J. Yee and C.K. Yuen, "Speculative Processing Mechanism in a Parallel Lisp Machine: Biddle", 1993 IEEE, vol. 1, Abstract page.

Chapter 8, entitled "Processing of Control Transfer Instructions" from Advanced Computer Architectures—A Design Space Approach, Deszo Sima et al., Addison–Wesley, 1997, p. 295–368.

"Speculative Processing Mechanisms In A Parallel Lisp Machine: Biddle" By J.J. Yee and C.K. Yuen; 1993 IEEE, pp. 457–465, vol. 1.

* cited by examiner

Primary Examiner—Daniel H. Pan
(74) Attorney, Agent, or Firm—O'Melveny & Myers LLP

(57) ABSTRACT

In processor with multiple execution units and at least one instruction buffer the dispatch of instructions to available units is prioritised for multiple paths following a conditional branch. For example, instructions in the instruction buffer relating to a predicted path following a conditional branch can be dispatched to available execution units in preference to instructions relating to any other path, the instructions relating to any other paths being dispatched to any execution units remaining available. Compared to a processor with conventional predictive branch execution, prioritised dispatch of instructions in accordance with prediction priorities enables optimisation of the use of available execution units. There is a gain in efficiency where a non-predicted path proves to be the correct path without impacting efficiency where the predicted path proves to be the correct path. This net gain in efficiency can be achieved with a minimum of additional resources.

15 Claims, 5 Drawing Sheets

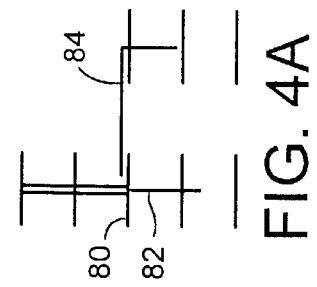
FIG. 2A
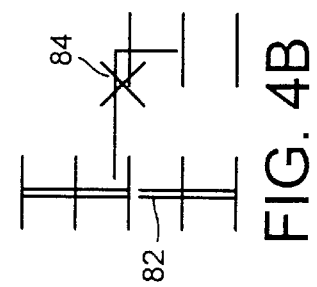
FIG. 2B
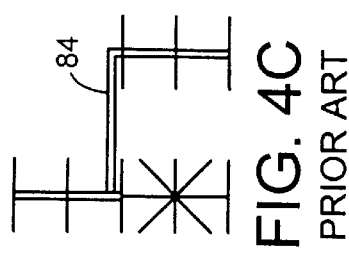
FIG. 2C
PRIOR ART
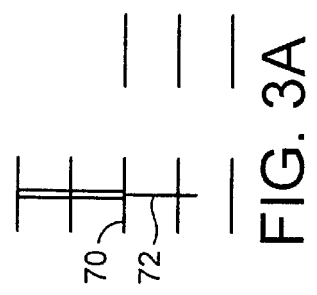
FIG. 3A
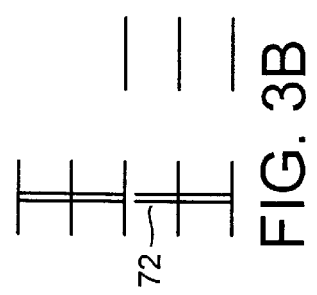
FIG. 3B
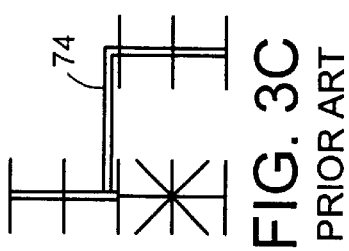
FIG. 3C
PRIOR ART
FIG. 4A
FIG. 4B
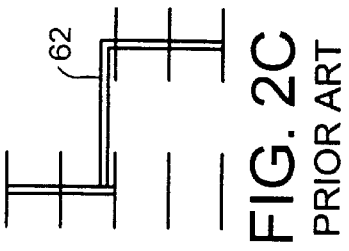
FIG. 4C
PRIOR ART

METHOD AND APPARATUS FOR BRANCH INSTRUCTION PROCESSING IN A PROCESSOR

BACKGROUND OF THE INVENTION

This invention relates to apparatus and methods for dispatching instructions in a processor, and to such a processor. In particular, the present invention relates to the handling and issue of branch instructions.

In a pipelined processor, there is a penalty for executing control-flow (branch) instructions. In particular, for conditional branches where the value of a condition is not known at the time of instruction issue, either the issue must be stalled until the information becomes available, or the instruction must be issued speculatively based on an assumed value.

Many different approaches to the handling of conditional branch instructions are known in the prior art.

A general description of pipeline processing architectures and the handling of branch instructions is to be found, for example, in "Advanced Computer Architectures—A Design Space Approach", by Messrs D Sima, T Fountain and P Kacsuk, published by Addison Wesley Longman Limited in 1997 (ISBN 0-201-42291-3). Various aspects of parallel processing architectures are described. These include parallel processing architectures including multiple execution units and parallel decoding of instructions in, for example, superscalar processors, as well as aspects of dependency checking, etc., associated therewith. Chapter 8 of that book on pages 295–368 is directed to the processing of control transfer instructions. The handling of unresolved conditional branches is discussed. Three basic approaches are identified, namely blocking branch processing, speculative branch processing, and multiway branch processing.

Blocking branch processing is a trivial approach to cope with unresolved conditional branches whereby, on detection of a conditional branch, the conditional branch is simply stalled until the specified condition can be resolved. Although this approach is simple to implement, it is inefficient because of the stalling of processing until the resolution of the condition on which a branch is based.

With speculative branch processing, on detection of an unresolved conditional branch, a guess is made as to the outcome of the condition and execution continues speculatively along the guessed path. If it is subsequently determined that the correct guess was made, the speculative execution can be confirmed and then continued. However, if an incorrect guess was made, all of the speculatively executed instructions have to be discarded and execution restart along the correct path. This approach offers higher performance than blocking branch processing. However, there is still a penalty to be paid when an incorrect guess is made due to the need to restart processing along the correct path. Various approaches are used to make the "guess" as to which path to execute speculatively following an unresolved conditional branch.

The simplest approach is to employ a fixed prediction, whereby the same guess is always made, either taking the branch path, or not taking the branch path. This unsophisticated approach makes use of the time during resolution of the condition on which the branch is to be based by speculatively executing instructions, but makes no attempt to assess the relative merits of the individual paths. A more sophisticated approach is to make a true prediction, either in a static manner on the basis of the object code to be executed, or dynamically on the basis of an execution history. Although the use of true prediction improves the chance of selecting the correct path for speculative execution, it does not overcome the problem of having to execute the alternative path from the branch point when an incorrect guess is made.

Multiway branch processing overcomes the performance disadvantages described with respect to speculative branch processing at the cost of duplicating the instruction issue and execution hardware. In other words, multiple sets of instruction issue, dispatch and execution units, and typically multiple instruction buffers, are provided in order to enable multiple instruction sequences following a branch to be executed in parallel during resolution of the condition for the branch. On resolution of the condition, the processing of the path not required is simply halted and the processing of the path determined by resolution of the condition is then proceeded with. Although the multiway branch processing does overcome the performance disadvantages of the speculative branch processing described above, it requires an extensive investment in hardware. Also, where multiple branch instructions occur in close proximity within a code sequence, mere duplication of the necessary hardware may be insufficient in order to provide a significant performance enhancement and accordingly more than two sets of instruction issue, dispatch and execution units may be required.

Accordingly, an object of the present invention is to mitigate the disadvantages of speculative branch processing without requiring the additional investment in hardware required by multiway branch processing.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided data processing apparatus including a plurality of execution units, at least one instruction buffer and an instruction processing mechanism. The instruction processing mechanism is configured to be operable to allocate respective priorities to instruction paths (instruction streams) following a conditional branch. The instruction processing mechanism is further operable to prioritize the dispatch of instructions for multiple paths to available execution units for speculative execution according to the allocated priorities.

Thus, for example, instructions in the instruction buffer relating to a predicted path, or instruction stream, following a conditional branch can be dispatched to available execution units in preference to instructions relating to any other paths, or instruction streams, instructions relating to other paths being dispatched to any execution units remaining available. Further instructions from the predicted path, or from all or any combination of paths, may be loaded into the instruction buffer.

By the use of the available execution units for executing instructions from a non-predicted path, progress can be made along a non-predicted path without a performance penalty compared to conventional speculative execution, yet without the hardware requirements of conventional multiway branch processing. Where a non-predicted path is subsequently shown to be the correct path, at least some progress can have been made along that path.

In order to identify the instructions for the respective paths, and accordingly, the respective priorities, priority tags can be associated with the instructions. The instruction buffer can be operable to receive undecoded, partially decoded or fully decoded instructions with any associated priority tag(s).

For dispatching an instruction, a dispatch unit can be responsive to any priority tags associated with instructions within a window in the instruction buffer to prioritize the issue of instructions from that window such that an instruction associated with a higher priority tag is issued in preference to an instruction associated with a lower priority tag. The window can be smaller than or the same size as the instruction buffer.

Alternatively, or in addition, where multiple execution buffers are each associated with one or more execution units and instructions are held in the execution buffers with any associated priority tags, an execution dispatch unit associated with each execution buffer can be responsive to any priority tags associated with instructions within a window in the associated execution buffer to prioritize the issue of instructions from that window such that an instruction associated with a higher priority tag is issued in preference to an instruction associated with a lower priority tag. Once again, the window can be smaller than or the same size as the execution buffer.

A predicted path can be either the branch path or the non-branch path. The predicted path can be determined using branch prediction logic.

In a preferred embodiment of the invention, a pre-decode unit is operable to determine instruction path priorities and to associate a priority tag with each instruction in an instruction cache. A decode unit can be operable to decode instructions from the instruction cache for transfer to the instruction buffer.

In an embodiment of the invention, a highest priority is allocated to a predicted path following a conditional branch. Priority can be allocated to instruction paths on a fixed prediction basis. Alternatively, priority can be allocated to instruction paths on a dynamic prediction basis. Moreover, priority can be allocated in respect of multiple branches. In such a case, multi-bit priority tags can be used to indicate respective priorities for multiple branches. Such an embodiment provides an extremely versatile branch processing structure which is ideally adapted to modern processing techniques which employ frequent and complex conditional branching.

A priority tag with each instruction in the instruction buffer, or an execution buffer, can be used to annul instructions relating to a path not taken, on resolution of the branch condition. Also, if the tag is issued with the instruction to an execution unit and maintained therein for the execution lifetime of the instruction, it can similarly be used to annul instructions already in execution. This permits early release of resources, for example output registers.

A preferred application of the invention is for superscalar microprocessors.

The invention also provides a microprocessor comprising a plurality of execution units, at least one instruction buffer, and an instruction processing mechanism configured to be operable to fetch instructions from a plurality of instruction paths following a conditional branch to allocate respective priorities to a plurality of instruction paths following a conditional branch and to prioritize the dispatch of instructions for speculative instruction to available execution units according to the allocated priorities.

The invention further provides a method of processing instructions in data processing apparatus comprising, in response to detection of a conditional branch, steps of:

allocating priorities to respective instruction paths following the conditional branch according to a prediction algorithm; and dispatching of instructions to available execution units according to the allocated priorities.

BRIEF DESCRIPTION OF THE DRAWINGS

Exemplary embodiments of the present invention will be described hereinafter, by way of example only, with reference to the accompanying drawings in which like reference signs relate to like elements and in which:

FIGS. 2A–2C illustrate a first example of speculative branch processing;

FIGS. 3A–3C illustrate a second example of speculative branch processing;

FIGS. 4A–4C illustrate multiway branch processing;

DESCRIPTION OF THE PREFERRED EMBODIMENTS

Figure 1:
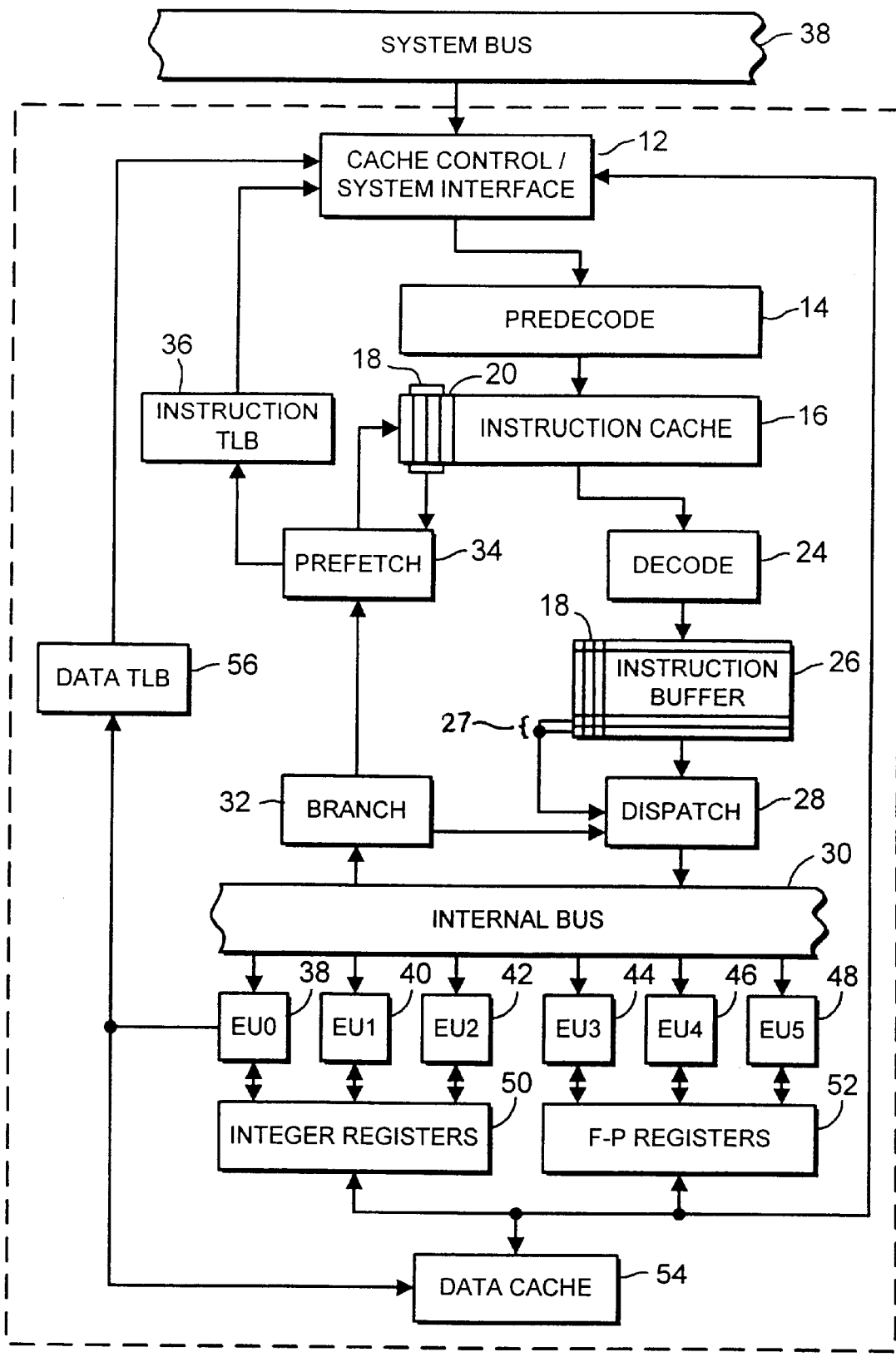
FIG. 1 is a schematic block diagram of a processor implementing an embodiment of the present invention.

FIG. 1 is a schematic block diagram of an example of a processor for implementing an embodiment of the invention.

A processor 10 comprises a system interface 12 for interfacing the processor with a system bus 38. The system interface 12 is also configured to provide cache control for an instruction cache 16 and a data cache 54. Instructions received from the system bus 38 via the system interface 12 are passed to a pre-decode unit, or pre-decoder 14. The pre-decoder partially decodes instructions and labels them using tags 18, 20. These tags 18, 20 are stored along with each instruction in the instruction cache 16.

As instructions are loaded into the instruction cache 16, the pre-decode unit detects branches, determines corresponding branch target addresses and establishes branch predictions. The branch predictions establish a predicted path and one or more non-predicted paths following a conditional branch instruction. Prediction bits indicating whether an instruction relates to a predicted path or a non-predicted path following a branch instruction are stored as tags 18 in the instruction cache 16. The prediction bits are updated according to the branch history. The prediction bits could be stored in a branch history table (not shown) which could be connected to an output of the pre-decoder 14 and be used by the pre-fetcher 34 for determining instructions to be fetched. Successor indices 20 and the prediction bits are held in the instruction cache, or alternatively in a separate buffer.

If the predicted path is taken, the successor index becomes the value of the determined branch target address, otherwise the next sequential address is taken as the successor index. The successor index can then be used as the next instruction fetch address, as fetched by a pre-fetch unit, or pre-fetcher 34. The determination as to whether to take a branch or not is performed by a branch unit or branching unit 32 which supplies an output to the pre-fetch unit 34. The pre-fetch unit 34 is operable to modify the prediction bits and successor indices according to the outcome of the branch decision. Pre-fetch addresses for subsequent instructions are passed via an instruction translation look-aside buffer (TLB) 36.

Instructions from the instruction cache 16 are passed to a decode unit 24 which decodes the instructions and places those instructions in an instruction buffer 26, along with the prediction tags 18.

A dispatch unit, or dispatcher, 28 is operable to dispatch the instructions from the instruction buffer 26 to the various execution units EU0–EU5 38–48. In the present instance, three integer execution units and three floating point execution units are shown. However, it should be noted that any number and type of execution unit appropriate for a particular processor may be provided. Thus, for example, a load/store instruction unit may be provided (in the present instance as EU0). One or more integer ALUs may be provided.

Illustrative examples of possible floating point units are floating point add/subtract, floating point multiply, floating point divide and/or square root, graphical add/subtract, graphical multiply. Accordingly, although only six execution units 38/48 are shown in FIG. 1, it will be appreciated that this is merely an example for the purposes of explanation of the present embodiment.

The dispatch unit 28 is operable to reference the prediction bits 18 in the instruction buffer and to use those instruction bits as priority indications for prioritize the dispatch of the instructions from the instruction buffer 26 to available execution units. Thus, instructions relating to a predicted path are issued in preference to instructions relating to a non-predicted path. This will be explained in more detail later.

As indicated in FIG. 1, the dispatch of the instructions by the dispatcher 28 is via an internal bus 30 to the various execution units 38–48. Data for use in execution of the instructions is provided from the cache control/system interface 12 to a data cache 54 and to integer and floating point registers 50 and 52, respectively. The execution units operate on the data in the integer registers and floating point registers 50 and 52, and the data cache 54. The output from the load/store unit EU0 are passed to the data cache 54 and via a data TLB 56 to the cache control/system interface 12.

Before proceeding further with a description of the operation of an embodiment of the invention, there follows a brief description of various conventional branch processing techniques with reference to FIGS. 2–4.

FIGS. 2A–2C illustrate conventional speculative branch processing of a branch path 62 following a branch 60 (branch taken). As represented in FIG. 2B, if it is subsequently determined that the branch 60 should not have been taken, the branch path 62 has to be discarded and it is then necessary to process the other path 64 following the branch 60. In this case, there is a penalty to be paid for resetting the program counter and state at the branch point and for executing the other path. If, however, it is determined that the path speculatively executed is indeed the correct path, then the results of the speculative execution can be used to proceed with the original path 62.

FIGS. 3A–3C illustrate conventional speculative branch processing where speculative processing of the straight path 72 rather than the branch path is performed (branch not taken). If it is subsequently determined that this was the correct path to follow, as represented in FIG. 3B, then the results of the speculative execution can be used. Alternatively, however, if it is subsequently determined that the branch path 74 should have been taken as illustrated in FIG. 3C, then the instructions speculatively executed cannot be used, and there is a penalty in resetting the program counter and continuing execution from the original branch point 70.

FIGS. 4A–4C illustrate a multiway branch processing whereby, following a branch point 80, both the straight path 82 and the branch path 84 are executed by respective instruction issue and execution units with the inherent additional cost of providing multiple hardware units. Whether the straight path 82 or the branch path 84 is determined as the correct path, the penalties described with respect to FIGS. 2C and 3C are avoided. However, as indicated above, the penalty in this case is the cost of the additional hardware.

In an embodiment of the present invention, it is possible to achieve some of the benefits of multiway processing without the additional hardware required therefor. An embodiment of the present invention takes advantage of the presence of the multiple execution units 38–48 which are typically provided in a modern processor architecture. The execution units will include execution units for different specialize functions, general purpose execution units, and may include multiple examples of certain of those execution units. Particularly where there are conditional branch instructions in the instruction stream, full use of available execution units may not be possible in a conventional processor. Accordingly, in an embodiment of the invention, the dispatch unit 28 is able to dispatch instructions from the instruction buffer 26 relating to a non-predicted path as well as instructions from a predicted path following a conditional branch instruction. Accordingly, an embodiment of the present invention can provide a form of enhanced speculative branch processing.

As indicated above, an embodiment of the present invention achieves this through the use of priority tags for the instructions in the instruction buffer, which are derived from priority tags, the prediction tags, in the instruction cache.

Figure 5:
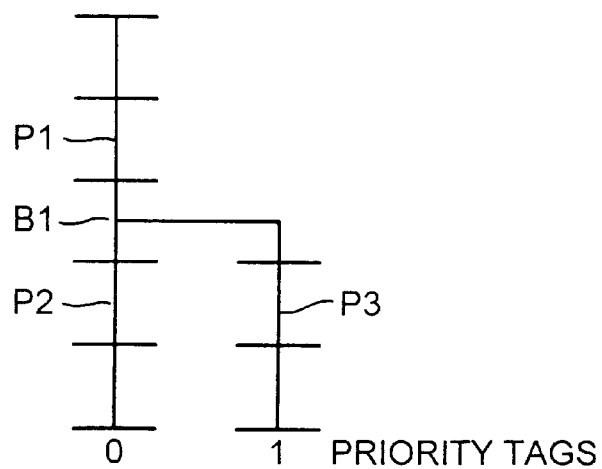
FIG. 5 illustrates an example of conditional branch processing according to the present invention.

With reference to FIG. 5, consider an example of the operation of an embodiment of the present invention where simple fixed prediction is employed for each conditional branch, namely that the branch is to be taken. Accordingly, a prediction tag is associated with each instruction following a branch instruction indicative of whether the instruction relates to the branch being taken (tag=1) or whether the branch is not taken (tag=0). The pre-decode unit 14 is operable to set the priority (prediction) tag 18 in the instruction cache when pre-decoding instructions to be placed in the instruction cache. These priority tags are passed to the instruction buffer 26 via the decode unit 24. Accordingly, the dispatch unit 28 is operable to detect the priority tags associated with the individual instructions and to dispatch instructions relating to a path for the branch being taken (i.e. the priority tag=1) rather than instructions relating to a path for the branch not being taken (tag=0).

This dispatch process could be thought of in the sense of dispatching all instructions within a window in the instruction buffer (sensed by the dispatch unit 28) before dispatching instructions relating to the non-predicted path. Where reference is made to the dispatch of instructions relating to the predicted path "before" those for a non-predicted path, it should be noted that this relates to a matter of priority, rather than timing. In practice, the dispatch of any non-predicted path instructions will be effected simultaneously with that of the predicted path instructions.

Figure 6:
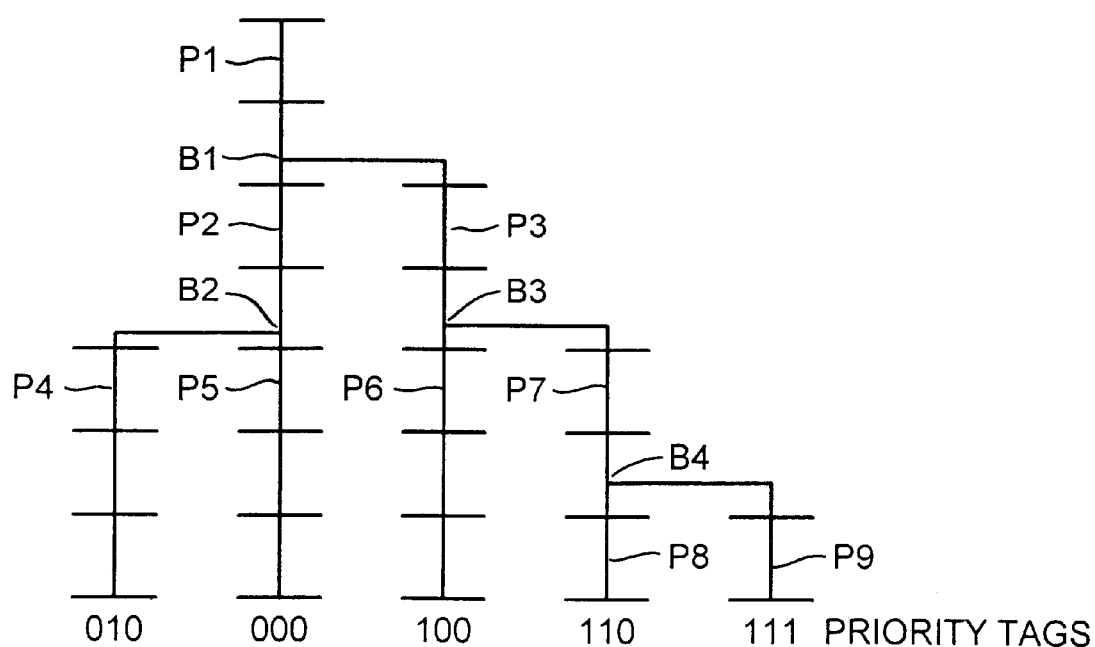
FIG. 6 illustrates another example of conditional branch processing according to the present invention.

As illustrated in FIG. 6, the same principle can be applied to deal with multiple branches within an instruction path. Here, multi-level priority is allocated to instruction paths in response to detection of a multiple branch paths. Thus, for example, through the use of three priority bits, it is possible to predict, in the extreme case, up to eight branches. FIG. 6 assumes, once again, a simple fixed prediction scheme whereby the predicted path is always the branch taken path.

Thus, in the example shown in FIG. 6, an initial instruction path P1 is bifurcated at a conditional branch point B1 into paths P2 and P3. The P3 path is taken to have a higher priority than the P2 path. Accordingly, using the three bit nomenclature, path P2 can be said to have a priority 000, and the P3 path to have a priority 100, whereby instructions relating to the P3 path will be dispatched in preference to those relating to the P2 path.

At a conditional branch point B2, the path P2 is bifurcated into a branch taken path P4 and a branch not taken path P5. It can be seen from the priority tags indicated that the P4 path is given a higher priority 010, than the priority for the P5 path, which remains the same as the P2 path at 000.

Similarly, the P3 path is bifurcated at a conditional branch point B3 into a branch taken path P7 and a branch not taken path P6. The branch path P7 is given a higher priority, 110, than the branch not taken path P6 which retains the priority 100 of the P3 path.

The P7 path is once more bifurcated at a conditional branch point B4 into a branch taken path P9 and a branch not taken path P8. Once again, the branch taken path P9 is allocated a higher priority, 111, than the branch not taken path P8 which retains the priority of the P7 path, namely 110.

It can be seen, therefore, that through the use of three priority bit tags, it is possible to accommodate many branch points with a very effective coding.

Respective priorities are allocated to individual paths at a branch point with two or more branch paths. Each priority can be represented by a multi-bit priority tag. Accordingly, multi-level priority can be allocated to instruction paths in response to the detection of a branch with two or more branch paths (e.g., three branch paths from one branch point).

Returning to FIG. 1, it can be seen that the dispatch unit 28 is able to use the priority tags to establish a priority for the dispatch of instructions in the instruction buffer. Instructions having the highest priority can be allocated to an execution unit first, and then instructions relating to the next highest priority and so on. The instructions are then dispatched simultaneously to the individual execution units for execution in those units. The dispatch unit 28 is operable to dispatch instructions from a window 27 in the instruction buffer 26, which window could include all instructions within the instruction buffer 26, or alternatively only certain locations therein, for example the last X locations (where X is a positive number). It can be seen that with a dispatch process as described, in addition to instructions relating to the predicted path, instructions relating to a non-predicted path may be issued when free execution units are available, thereby enabling progress to be made along the predicted and non-predicted paths pending resolution of the branch condition. Once the branch condition has been resolved, it is then possible to determine whether to follow the predicted, or one of the non-predicted paths. It will be appreciated, in the case shown in FIG. 6, where multiple conditional branches are present, that the condition for branch B1 will typically be resolved before the condition for the branch B2 or B3. Accordingly, if it is decided that the P3 path is taken from the branch point B1, all instructions relating to paths P2, P4 and P5 may at that point be annulled. Any results relating to the speculative execution of instructions relating to the paths P2, P4 and P5 may then be annulled as well.

In any particular implementation, various solutions to the annulling of results from instructions relating to a path not taken may be adopted. For example, the output from an execution unit may be stored in a temporary register in the registers 50/52 pending resolution of the branch condition, and may then be annulled in the event that the results relate to an instruction for a non-taken path.

Also, on determining the resolution of a branch condition, the dispatch unit 28 can be configured to simply annul (e.g. delete or ignore) instructions relating to a non-taken path.

A priority tag with each instruction in the instruction buffer, or an execution buffer, can be used to annul instructions relating to a path not taken, on resolution of the branch condition. Also, if the tag is issued with the instruction to an execution units and maintained therein for the execution lifetime of the instruction, it can similarly be used to annul instructions already in execution. This permits early release of resources, for example output registers.

Thus, where it is subsequently determined that the predicted path is the correct path, then the results of the non-predicted path or paths can be annulled and processing can continue in a conventional manner along the predicted path. The advantage arises in an embodiment of the present invention that, where it is subsequently determined that a predicted path is not correct, it is typically not necessary to dispatch all of the instructions starting from the branch point for processing of the non-predicted path as some progress will have already been made down that path by execution of instructions from that path by the available execution units. Accordingly, the speculatively executed instructions from the predicted path can be annulled and the execution units thus freed up can be used for execution of the instructions from the non-predicted path.

Figure 7:
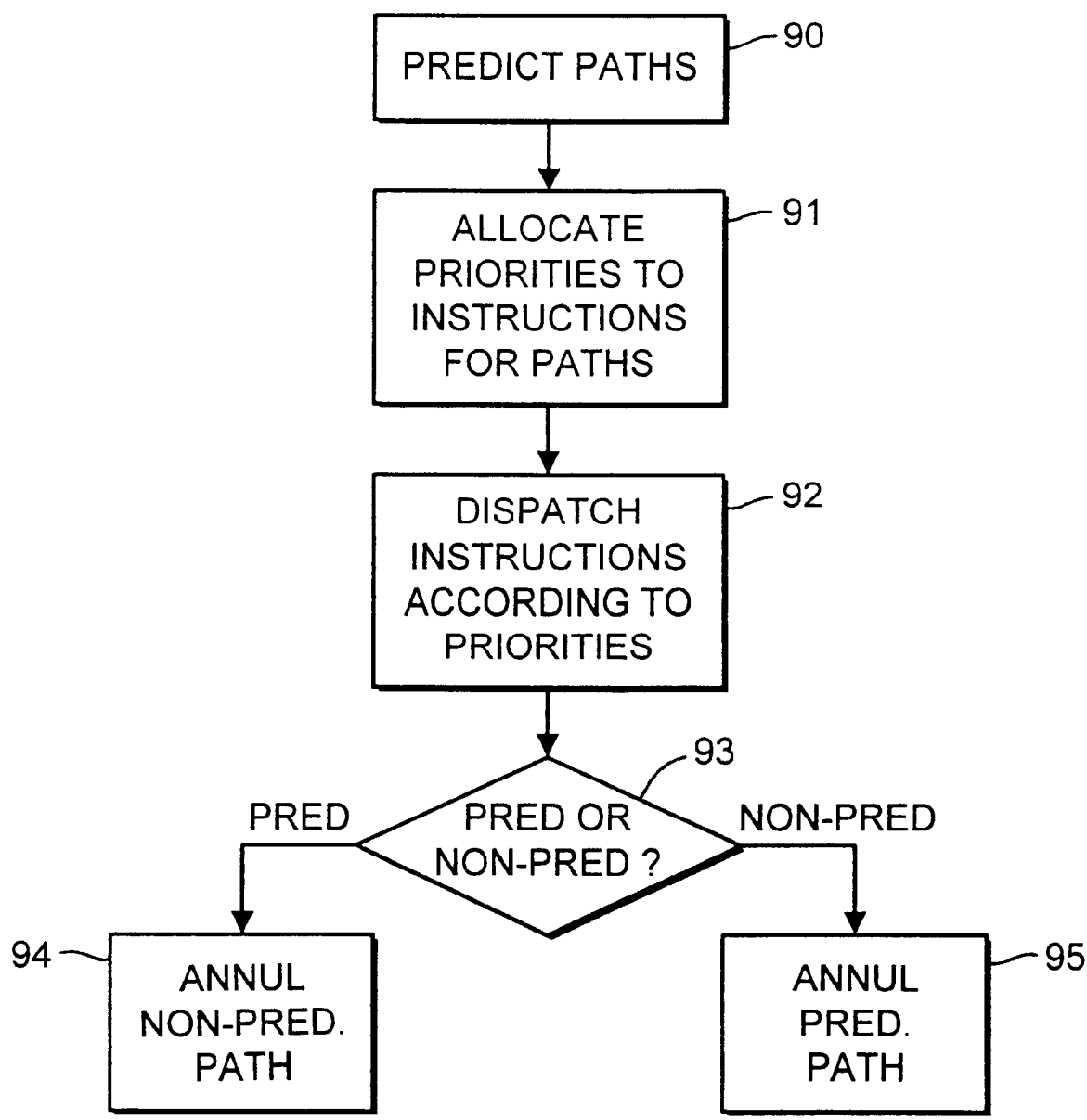
FIG. 7 is a flow diagram illustrating conditional branch processing in accordance with an embodiment of the present invention.

To further illustrate an example of operation of an example of an embodiment of the present invention, reference is made to FIG. 7 which gives an overview of steps in a method where one priority tag is employed.

Thus, in step 90, on detecting a conditional branch instruction, priorities are allocated to individual instructions for the paths resulting from the conditional branch point. Steps 90 and 91 are performed by a pre-decode unit 14 in the embodiment of FIG. 1. The priorities are recorded in respect of each of the instructions by the use of priority tags associated with the individual instructions, either stored with those instructions, or in a separate buffer memory.

In step 92, instructions are dispatched according to the priority set for those instructions. In other words, instructions within a given window in an instruction buffer are issued to available execution units and where execution units remain available, instructions relating to other paths are dispatched in order of priority. In the embodiment shown in FIG. 1, these steps are performed using the instruction buffer 26 and the dispatch unit 28.

When the condition for the branch is resolved, (in the example shown in FIG. 7 between the predicted and non-predicted paths) then, in either step 94 or step 95, the non-predicted or the predicted path, respectively, is annulled. The evaluation of the branch condition is effected in the embodiment of FIG. 1 in the branch condition unit 32, and the annulling of the branches is performed by the dispatch unit 28.

Although the flow diagram of FIG. 7 deals specifically with a decision between a first and a second path (i.e. the predicted path and the non-predicted path) with the predicted path being allocated a higher priority than the non-predicted path, it will be appreciated that this process can be extended to multiple layers of prediction for multiple branch points as represented in FIG. 6.

Also, with reference to FIGS. 5, 6 and 7, it will be noted that the branch not taken path may be the predicted path in another embodiment, or that a more complex prediction algorithm based on historical data may be used to predict the outcome of any branch condition. Accordingly, the priority tags allocated will depend on the outcome of the prediction technique employed. Any suitable prediction technique may be used, for example a prior art prediction technique as described in "Advanced Computer Architectures—A Design Space Approach", referenced earlier.

In FIG. 1, a single instruction buffer 26 is provided with a single dispatch unit 28 which dispatches instructions to the available execution units via the internal bus 30. In such an embodiment, the dispatch unit 28 will provide conventional dependency checking on the instructions to ensure that all data and instruction dependencies in the data stream are taken into account.

Figure 8:
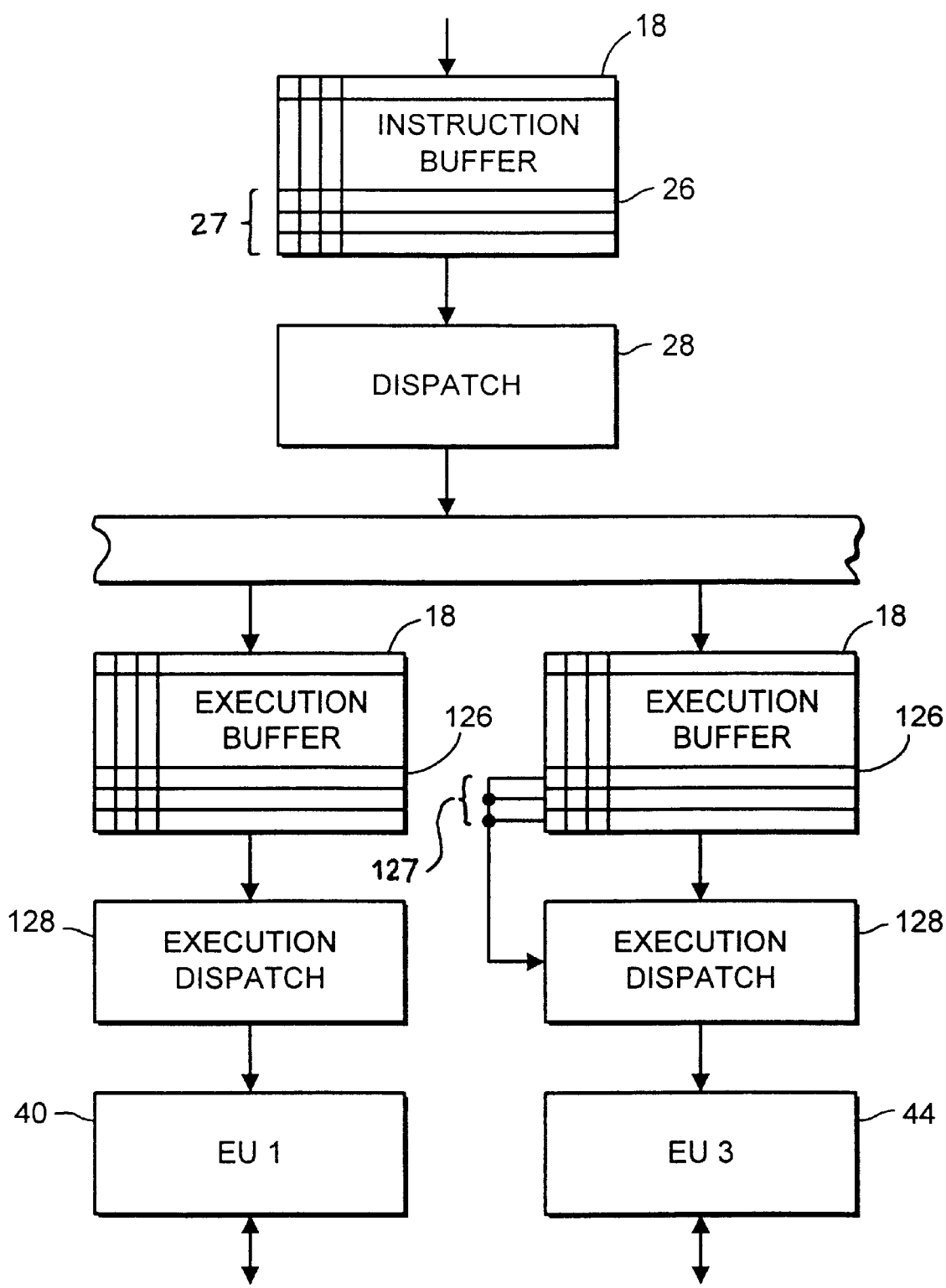
FIG. 8 illustrates a modification to the embodiment of the FIG. 1.

FIG. 8 illustrates a modification to the arrangement shown in FIG. 1, where, in addition to the instruction buffer 26 and the dispatch unit 28, a further execution buffer and execution dispatch unit are associated with each of the execution units or with a group of the execution units. As illustrated in FIG. 8, an execution buffer 126 and an execution dispatch unit 128 are associated with each of execution units 40 and execution units 44. It is to be assumed that similar execution buffers and execution dispatch units are associated with the other execution units. Such an execution buffer unit can often be described as a reservation station or a shelving buffer.

The priority tags (prediction bits) are also passed from the instruction buffer 26 to the execution buffers 126. Prioritized dispatch of the instructions from a window 27 in the instruction buffer 26 can be provided by the dispatcher 28. Alternatively, or in addition, prioritized dispatch of the instructions from a window 127 within the individual execution buffers 126 by the execution dispatch units 128 may be performed in accordance with the priority tags referred to earlier. The size of the window 127 may correspond to, or be smaller than, the size of the execution buffer 126. Accordingly, the prioritized dispatch of the instructions according to the representative paths may be made at different levels within the processor, as appropriate to a particular application or embodiment of the invention.

It will be appreciated that many alternatives may be envisaged to the particular embodiments described. Thus, for example, the overall structure of the processor may be quite different from that shown in FIG. 1. By way of simple example, the prediction unit need not be provided in a pre-decode unit, but could be provided at another point within the instruction processing mechanism. Other configurations with different numbers of instruction buffers, execution units, internal bus structures, branch determination units, etc., may be envisaged within the scope of the present invention.

Also, in the example shown, it is assumed that at any conditional branch instruction point, only two paths may result. However, it could be that three or more paths may be available from a branch condition point. In such a case, individual priorities can be allocated to three or more paths by the use of more than one priority bit for each conditional branch point. Thus, two bits may provide different priorities for up to four paths, three bits different priorities for up to eight parts, and so on.

There has been described embodiments of an invention which provide for prioritized dispatch of instructions on the basis of which of a plurality of paths, or instruction streams, follow a conditional branch point. Thus, in an embodiment of the invention, instructions relating to a predicted path are dispatched from an instruction buffer to respective execution units, with instructions relating to a non-predicted path or paths being dispatched to any remaining execution units to take advantage of any excess processing capacity. Making use of any available execution units for instructions from a non-predicted path improves efficiency where the non-predicted path proves to be the correct path, without impacting efficiency where the predicted path proves to be the correct path. This net gain in efficiency can be achieved with a minimum of additional resources.

Accordingly, it can be seen that an embodiment of the present invention can provide enhanced performance with respect to conventional predictive branching without the additional cost of duplicated hardware as required by multiway branching.

It will be appreciated that although particular embodiments of the invention have been described, many modifications/additions and/or substitutions may be made within the spirit and scope of the present invention as defined in the appended claims.

For example, in the particular embodiment described, the instruction buffer receives decoded instructions. However, in other embodiments, the instruction buffer may hold undecoded, or partially decoded instructions with any associated priority tags. The decoding or the completion of the decoding can be effected downstream of the instruction buffer.

Indeed, the data processing apparatus may have a significantly different architecture and structure while still being able to employ the present invention, and it will be appreciated that the present description is merely illustrative of one possible architecture and structure for an embodiment of the invention.

What is claimed is:

1. Data processing apparatus comprising a plurality of execution units, at least one instruction buffer from which instructions are dispatched to the plurality of execution units, and an instruction processing mechanism configured to be operable to allocate respective priorities to a plurality of instruction paths following a conditional branch and to prioritize a dispatch of instructions for multiple paths to available execution units for speculative execution according to the allocated priorities, wherein the instruction processing mechanism associates priority tags with instructions, and wherein the instruction buffer is operable to receive instructions with any associated priority tag.

2. The apparatus of claim 1, comprising a dispatch unit, the dispatch unit being responsive to any priority tags associates with instructions within a window in the instruction buffer to prioritize a issue of instructions from said window such that an instruction associated with a higher priority tag is issued in preference to an instruction associated with a lower priority tag.

3. The apparatus of claim 2, wherein a size of the window corresponds to a size of the instruction buffer.

4. Data processing apparatus comprising a plurality of execution units, at least one instruction buffer, and an instruction processing mechanism configured to be operable to allocate respective priorities to a plurality of instruction paths following a conditional branch and to prioritize a dispatch of instructions for multiple paths to available execution units for speculative execution according to the allocated priorities, wherein the instruction processing mechanism associates priority tags with instructions, and wherein the instruction buffer is operable to receive instructions with any associated priority tag, and said data processing apparatus further comprising multiple execution buffers associated with one or more execution units, instructions being held in the execution buffers with any associated priority tags, an instruction buffer dispatch unit for dispatching instructions from the instruction buffer to the multiple execution buffers, and a plurality of execution dispatch units, each of which is associated with each execution buffer and is responsive to any priority tags associated with instructions within each corresponding window in each associated execution buffer to prioritize an issue of instructions from said window such that an instruction associated with a higher priority tag is issued in preference to an instruction associated with a lower priority tag.

5. The apparatus of claim 4, wherein a size of each window corresponds to a size of each execution buffer.

6. Data processing apparatus comprising a plurality of execution units, at least one instruction buffer from which instructions are dispatched to the plurality of execution units, and an instruction processing mechanism configured to be operable to allocate respective priorities to a plurality of instruction paths following a conditional branch and to prioritize a dispatch of instructions for multiple paths to available execution units for speculative execution according to the allocated priorities, further comprising an instruction cache and an instruction pre-decode unit, said pre-decode unit being operable to determine instruction path priorities and to associate a priority tag with each instruction in the instruction cache.

7. The apparatus of claim 6, further comprising a decode unit operable to decode instructions from the instruction cache for transfer to the instruction buffer.

8. Data processing apparatus comprising a plurality of execution units, at least one instruction buffer, and an instruction processing mechanism configured to be operable to allocate respective priorities to a plurality of instruction paths following a conditional branch and to prioritize a dispatch of instructions for multiple paths to available execution units for speculative execution according to the allocated priorities, wherein respective priorities are allocated to individual paths at a branch point with two or more branch paths, and wherein each priority is represented by multi-bit priority tag.

9. A method of processing instructions in data processing apparatus comprising, in response to detection of a conditional branch, steps of:
 a) allocating priorities to instruction paths following the conditional branch according to a prediction algorithm;
 b) dispatching of instructions to available execution units according to the allocated priorities,
 wherein step (a) includes associating priority tags with instructions, and wherein instructions are held with any priority tags in an instruction buffer.

10. A method of processing instructions in data processing apparatus comprising, in response to detection of a conditional branch, steps of:
 a) allocating priorities to instruction paths following the conditional branch according to a prediction algorithm;
 b) dispatching of instructions to available execution units according to the allocated priorities,
 wherein step (a) includes associating priority tags with instructions, and wherein instructions are held with any priority tags in an instruction buffer, and further wherein step (b) comprises responding to any priority tags associated with instructions within a window in the instruction buffer to prioritize an issue of instructions from said window such that an instruction associated with a higher priority tag is issued in preference to an instruction associated with a lower priority tag.

11. The method of claim 10, wherein a size of the window corresponds to a size of the instruction buffer.

12. A method of processing instructions in data processing apparatus comprising, in response to detection of a conditional branch, steps of:
 a) allocating priorities to instruction paths following the conditional branch according to a prediction algorithm;
 b) dispatching of instructions to available execution units according to the allocated priorities,
 wherein step (a) includes associating priority tags with instructions, and wherein instructions are held with any priority tags in an instruction buffer, and further wherein step (b) comprises:
  dispatching instructions from the instruction buffer to multiple execution buffers, each of which is associated with one or more execution units with any associated priority tags; and
  responding to any priority tags associated with instructions within a window in an execution buffer to prioritize an issue of instructions from said window such that an instruction associated with a higher priority tag is issued in preference to an instruction associated with a lower priority tag.

13. The method of claim 12, wherein a size of each window corresponds to a size of each execution buffer.

14. A method of processing instructions in data processing apparatus comprising, in response to detection of a conditional branch, steps of:
 a) allocating priorities to instruction paths following the conditional branch according to a prediction algorithm:
 b) dispatching of instructions to available execution units according to the allocated priorities,
 wherein step (a) comprises pre-decoding an instruction to determine a conditional branch and to determine instruction path priorities for instruction paths resulting from the conditional branch, and associating a priority tag with instructions, and storing the instructions in an instruction cache, and further wherein each priority tag associated with instructions is stored in the instruction cache in association with the associated instructions.

15. A method of processing instructions in data processing apparatus comprising, in response to detection of a conditional branch, steps of:
 a) allocating priorities to instruction paths following the conditional branch according to a prediction algorithm;
 b) dispatching of instructions to available execution units according to the allocated priorities,
 wherein step (a) comprises pre-decoding an instruction to determine a conditional branch and to determine instruction path priorities for instruction paths resulting from the conditional branch, and associating a priority tag with instructions, and storing the instructions in an instruction cache, and further wherein step (a) comprises decoding instructions from the instruction cache f transfer to an instruction buffer.

\* \* \* \* \*